(No Model.)
R. H. MULLEN & H. T. ATKINS.
MANUFACTURE OF MACHINE BELTING.
No. 316,906. Patented Apr. 28, 1885.
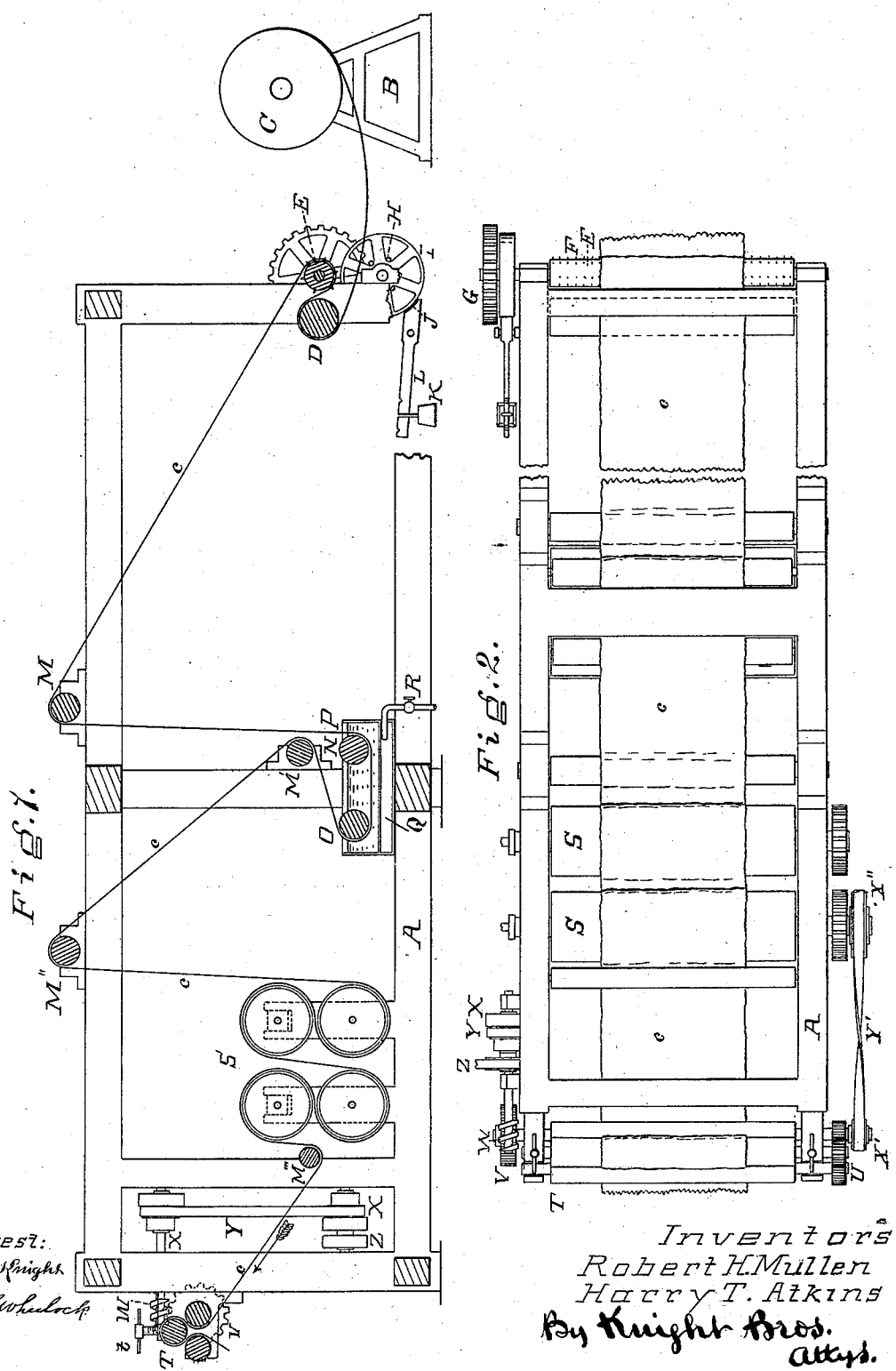

UNITED STATES PATENT OFFICE.

ROBERT H. MULLEN AND HARRY T. ATKINS, OF CINCINNATI, OHIO, ASSIGNORS TO PEARCE, ATKINS & CO., OF SAME PLACE.

MANUFACTURE OF MACHINE-BELTING.

SPECIFICATION forming part of Letters Patent No. 316,906, dated April 28, 1885.

Application filed December 19, 1884. (No model.)

*To all whom it may concern:*

Be it known that we, ROBERT H. MULLEN and HARRY T. ATKINS, both of Cincinnati, Hamilton county, Ohio, have jointly invented a new and useful Process for the Manufacture of Machine-Belting, of which the following is a specification.

Our invention relates to a process for taking the stretch out of textile belting in the manufacture of the same. We both increase the strength and durability, and prevent the possibility of subsequent stretching during use, of textile belting and webbing, by painting and drying the same under stretch, as hereinafter fully explained.

In the accompanying drawings we show our machine which we prefer to use in our process.

Figure 1 is a vertical section in the plane of motion, and Fig. 2 is a plan of our stretching and setting apparatus.

The belting to be treated is pulled over rollers suitably arranged while it is sufficiently retarded to stretch the material between the reel or bolt and the delivering-rolls, the stretched portion being painted and dried while under stretch to set and fix or hold the material in its stretched condition.

A may represent portions of the supporting-framing of our stretching, painting, and setting apparatus.

B represents a reel-stand to hold a reel or bolt, C, of belting or webbing to be operated upon. From said reel the belting is carried around two drums, D E. The periphery of drum E is armed with spurs F. A spur-wheel, G, on the said drum gears to a pinion, H, on brake-wheel I, with which is associated a brake or rubber, J, that is capable of being made to press with any desired stress upon the periphery of the said wheel I by adjustment of weight K on lever L. From the drum E the piece of belting or webbing c to be operated upon is carried around a fair-leader, M, and thence around two wallowers, N O, which are journaled horizontally within a tank, P, charged with the paint or composition with which it is desired the goods should be saturated. Said paint is maintained at the desired temperature by any suitable device—such as a chamber, Q—underneath the said tank, which receives a steam-pipe, R. From the painting-tank the goods are conducted around fair-leaders M′ M″ to and around one or more steam-heated calenders, S, whence the said goods are conducted around a fair-leader, M‴, to a group of delivering-rollers, T, which are maintained at such contiguity to each other as to tightly grip the goods, and in so doing to coact with the brake-mechanism D E F G H I J K, to subject the goods to the desired tensile strain simultaneously with the application and setting of the composition. The second drum or fair-leader, M′, is so located as to enable it to sweep back into the tank P the surplus paint that has not been removed by the drum O.

Rotation of the delivering-rollers T is effected by any suitable driving mechanism—such, for example, as by geared connection U from roller to roller, and by a worm-wheel, V, upon one of said rollers into which gears a worm, W, which is connected by a system of step-pulleys, X, and belt Y with the driving-pulley Z. By shift of the belt Y to the right or to the left a less or greater speed of the rollers T, and consequent tension and delivery of the goods, is secured. The operator has, therefore, at his command two distinct means of controlling the tension of the goods, with such relative discretional adjustment as may be found desirable.

To enable the tension-strain to be concentrated, when desired, at the calendering mechanism, (where the stuff receives its permanent "set,") the delivery-shaft has an additional pulley, X′, which communicates by a belt, Y′, with a pulley, X″, upon one of the calender-shafts.

Degree of nip of the delivery-rollers is regulated by a temper-screw, t.

We reserve the right to embody the machine and product herein described in subsequent applications.

We claim as new and of our invention—

1. That improvement in the art of stretching and painting canvas belting which consists in drawing the belt forward under tension and applying a coat of paint and drying the same while the belt is under continuous movement.

2. That improvement in the art of stretching and coating canvas belting which consists in drawing the belt forward under tension, passing the same through a solution of paint, removing the surplus paint and subjecting the coated portion to the action of a heated surface or surfaces while it is continuously moving.

In testimony of which invention we hereunto set our hands.

ROBERT H. MULLEN.
HARRY T. ATKINS.

Attest:
GEO. H. KNIGHT.
CHAS. E. PRIOR.